United States Patent [19]

Arendt et al.

[11] 4,349,656
[45] Sep. 14, 1982

[54] THIODIETHANOL BASED POLYURETHANE ELASTOMERS HAVING IMPROVED DYNAMIC PROPERTIES AND METHOD FOR PRODUCTION THEREOF

[75] Inventors: Volker D. Arendt, Princeton; Tsi T. Li, Milltown, both of N.J.

[73] Assignee: American Cyanamid Company, Stamford, Conn.

[21] Appl. No.: 228,509

[22] Filed: Jan. 26, 1981

Related U.S. Application Data

[62] Division of Ser. No. 171,615, Jul. 23, 1980, Pat. No. 4,284,761.

[51] Int. Cl.³ ............................................. C08G 18/38
[52] U.S. Cl. ........................................ 528/63; 528/64; 528/76
[58] Field of Search ............................ 528/63, 64, 76

[56] References Cited

U.S. PATENT DOCUMENTS 2,844,566  7/1958  Schwarz et al. ............... 528/373
3,951,927  4/1976  Aloia .............................. 528/373
3,985,708  10/1976  Chang et al. .................. 528/373
4,093,599  6/1978  Aloia .............................. 528/373
4,094,859  6/1978  Chang ........................... 528/373
4,225,695  9/1980  Schuster et al. ................ 528/76

Primary Examiner—Maurice J. Welsh
Attorney, Agent, or Firm—Frank M. Van Riet

[57] ABSTRACT

A method for the preparation of a polyetherthioether copolymer glycol represented by the formula:

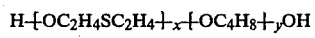

wherein the mole ratio x/y is in the range of about 45:55 to 60:40, respectively. More specifically, a method for the preparation of a copolymer of thiodiethanol and 1,4-butanediol wherein the mole ratio x/y is about 50:50. Also, the copolymers produced thereby and polyurethane elastomers produced therefrom, particularly those produced from the 50:50 copolymer, and to their use in solid tires having improved dynamic mechanical properties.

8 Claims, No Drawings

THIODIETHANOL BASED POLYURETHANE ELASTOMERS HAVING IMPROVED DYNAMIC PROPERTIES AND METHOD FOR PRODUCTION THEREOF

This is a division of application Ser. No. 171,615 filed 7/23/80 now U.S. Pat. No. 4,284,761, issued Aug. 18, 1981.

BACKGROUND OF THE INVENTION

Polyalkyleneether-thioether glycols, having the structure

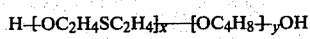

wherein the mole ratio x:y ranges from about 45:55 to 60:40, respectively, are disclosed by Schwarz et al., U.S. P at. No. 2,844,566. Example 1 therein describes the preparation of a copolymer of thiodiethanol and 1,4-butanediol (1/1) having a molecular weight of about 930 (by hydroxyl number determination). Such copolymers, wherein the mole percentage of thiodiethanol represents 50% or less, are extremely difficult to prepare by conventional acid catalyzed condensation procedures; that is, the composition of the resulting polymer does not conform to the mole ratio of the monomers charged. The reason for this is that since the hydroxyl groups of thiodiethanol are activated by the central sulfur atom, there is a pronounced tendency for thiodiethanol to homopolymerize rather than copolymerize. Therefore, under normal conditions, the composition of Schwarz et al is mostly polythiodiethanol. This is true whether the alkanediol comonomer is 1,4-butanediol or any other alkanediol.

The product described by Schwarz et al not only contains large amounts of homopolythiodiethanol, thereby being quite different in composition from the macroglycols of the present invention, but also results from a process lacking in the critical extraction procedure of the present invention described below. Therefore, the macroglycol of Schwarz et al. does not yield polyurethane elastomers which exhibit the outstanding dynamic mechanical properties of those of the present invention.

SUMMARY OF THE INVENTION

As will be shown, it is not sufficient, in order to obtain desirable dynamic properties in cast polyurethanes, merely to copolymerize thiodiethanol with another alkanediol, and to use such copolymer as a polymeric diol in the preparation of such polyurethanes. For, firstly, 1,4-butanediol as a comonomer has been found to confer better dynamic response to the resulting polyurethane than other alkanediols and secondly, it is critical, for superior performance, that the copolymeric diol derived from thiodiethanol and 1,4-butanediol be extracted with water prior to conversion to the polyurethane. The latter discovery is particularly unexpected, inasmuch as the water-extractable fraction is relatively small and the molecular weight of the remaining polyol increases by only a few percent as a result of the extraction. Thus, when a copolymeric diol made as described herein, is converted by conventional polyurethane technology to an isocyanate-terminated prepolymer and then cured with a diamine, elastomers having outstanding dynamic mechanical properties are produced.

DESCRIPTION OF THE INVENTION INCLUDING PREFERRED EMBODIMENTS

The present invention provides a method for the preparation of polyether-thioether glycols of the above formula which comprises condensing 1,4-butanediol with an amount of thiodiethanol to form a trimer:

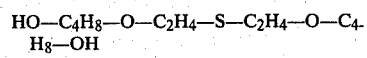

and then completing the condensation by the incremental addition of the remaining thiodiethanol at a rate corresponding essentially to the rate of removal of water, such that no significant excess of thiodiethanol is present in the reaction mixture at any given time.

In carrying out the process of the invention, a reaction mixture of 1,4-butanediol and thiodiethanol (mole ratio about 2/1) is condensed at a temperature of about 160°–205° C. in the presence of an acid catalyst, such as p-toluenesulfonic acid or phosphorous acid, until the theoretical amount of water is removed. Then, under the same reaction conditions, the remaining thiodiethanol is added incrementally at a rate essentially equal to the rate of removal of water as it is formed. The progress of the condensation reaction is monitored by the amount of water removed and by the viscosity of the reaction mixture. When all of the thiodiethanol has been added, the reaction mixture is heated with stirring until the desired molecular weight, as determined by viscosity, for example, using a Brookfield viscometer, in the range of about 800 to 2000 CPS at 30° C. is achieved. The reaction mixture is then cooled and the catalyst and low-molecular-weight polymer fractions are extracted with water (ratio water/polymer about 1/2–3/1 ) by heating at a temperature of about 50°–70° C. and separating the aqueous extract from the polymer. The polymer is then stripped with steam (to remove unreacted monomers) and dried under vacuum.

The extraction step is an essential part of the present invention. It was unexpectedly discovered that only when the macroglycols were extracted did the resulting polyurethane prepolymers yield elastomers exhibiting outstanding dynamic mechanical properties. This is surprising, since the extraction does not remove significant amounts of materials and does not result in any more than a modest increase in molecular weight, for example, from about 850 to about 1000, or even less.

In the preparation of isocyanate-terminated prepolymers from the polyether-thioethers of the invention, any diisocyanate known to be useful in the preparation of polyurethanes can be used. Such diisocyanates include toluene-2,4-diisocyanate, toluene-2,6-diisocyanate, and isomeric mixtures thereof; diphenylmethane 4,4'-diisocyanate; naphthalene 1,5-diisocyanate, and the like. Toluene diisocyanates are preferred. The prepolymers are prepared by conventional polyurethane technology by reacting the macroglycol with about 1.5–2.5 moles of the diisocyanate.

The elastomers are prepared by mixing, at a temperature of about 80°–100° C., with from about 90 to 110% of the stoichiometrically required amount of a diamine curative and curing the mixture in a mold at a temperature of about 100° C. Suitable diamine curatives include methylenebis (o-chloroaniline), bis (2-aminophenylthio)ethane, and the like.

The following examples are set forth for purposes of illustration only and are not to be construed as limitations on the present invention. All parts and percentages are by weight unless otherwise specified.

EXAMPLE 1

Preparation of a Macroglycol from Thiodiethanol and 1,4-Butanediol (1/1)

A suitable reaction vessel is charged with 279 parts (3.10 molar proportion) of 1,4-butanediol and 186 parts (1.52 molar proportion) of thiodiethanol. The mixture is heated to 165° C. in the presence of 0.6 part (0.1% by weight) of p-toluenesulfonic acid monohydrate, under a nitrogen atmosphere, removing water as it is formed. After about 4 hours, the theoretical amount of water is recovered, resulting in a trimer (mole ratio of 1,4-butanediol to thiodiethanol of about 2/1). At this point, the remaining thiodiethanol (1.52 molar proportion) is added in increments at a rate corresponding to the rate of removal of water, in order to ensure that the concentration of thiodiethanol in the reaction mixture is small at any given time. The progress of the reaction is monitored by the removal of water and by the viscosity (Brookfield). After 24 hours, the addition of thiodiethanol is complete and the reaction is continued until the viscosity is about 480 centipoises, measured at 30° C., corresponding to a molecular weight of about 730. Thereupon, the reaction mixture is cooled and the catalyst and low-molecular-weight fractions are extracted with water (ratio water/polymer equal 1/1) for about one hour at 60° C. The polymer is then centrifuged. This increases the molecular weight of the polymer to about 812. A repeat of the extraction increases the molecular weight to about 1000. The polymer is then stripped with steam at 100°–105° C. for about 7 hours and the remaining water is removed under vacuum (~9mm Hg) at 100° C. until a Karl Fischer analysis indicates 0.05–0.1% water. The product is a pale yellow syrup at room temperature.

The procedure of Example 1 is followed in all its essentials to prepare macroglycols using, instead of 1,4-butanediol, the following diols:

|  | Diol | Molecular Weight |
| --- | --- | --- |
| Example 1a* | ethylene glycol | 1100 |
| Example 1b* | diethylene glycol | 860 + 1840$^x$ |
| Example 1c* | 1,6-hexanediol | 1360 + 875$^x$ |

$^x$mixtures of different preparations to give a macroglycol having a molecular weight of about 1000
*=comparative

EXAMPLE 2

Preparation of Isocyanate-Terminated Prepolymer

The macroglycol prepared in Example 1 (218.5 parts, 0.2185 mol) is dried to 0.02% water by heating at 100° C./-11 mm Hg for 3 hours. After cooling to room temperature, toluene 2,4-diisocyanate (72.5 parts, 0.4152 mol; NCO/OH=1.9/1) and hexachloro-1,3-butadiene (0.13 part) are added rapidly to the macroglycol. The mixture is stirred under a nitrogen blanket and the heat of reaction is removed by external cooling. When the exotherm subsides, the reaction mixture is heated at 80° C. for 4 hours. Benzene-sulfonyl chloride (0.13 part) and a commercially available antifoaming agent (0.016 part) are added and the prepolymer is filtered. The NCO content is 5.5% (Theory 5.7%).

The function of the hexachlorobutadiene and benzenesulfonyl chloride is to provide a latent source of acid in trace amounts. Such additives are stabilizers for urethane prepolymers; that is, they reduce the extent to which NCO functionality is lost when the prepolymer is heated or stored for extended periods of time.

The procedure of Example 2 is followed in all its essentials to prepare isocyanate-terminated prepolymers from the macroglycols of Examples 1a, b, and c. The following NCO content is found:

| Prepolymer of | Comonomer | %NCO |
| --- | --- | --- |
| Example 1a* | ethylene glycol | 5.8 |
| Example 1b* | diethylene glycol | 4.7 |
| Example 1c* | 1,6-hexanediol | 5.6 |

*=comparative

EXAMPLE 3

Preparation of Solid Polyurethane Tire

The prepolymer of Example 2 (300 parts) is heated to 100° C., degassed under vacuum, and mixed with 47.2 parts of molten methylene bis (o-chloroaniline). After 30–60 seconds, the mixture is again degassed and poured into a mold fitted with a prepared hub. [The hub preparation consists of coating the hub with adhesive, drying at room temperature for 30 minutes, and heating to 100° C. during another 30 minutes.] After pouring, the wheel is cured for 16 hours at 100° C. and left to age at room temperature for 3 days before testing.

Dynamic wheel testing is performed on a wheel tester, which simulates wheel performance at a speed of 6.5 miles per hour—a speed typical of forklift truck operation-under increasing loads. The wheel tester has given very good correlation with actual performance in the past. The equipment consists of an electrically-driven rotating drum which, in turn, drives the test wheel. Suspended from the axle of the test wheel is a load platform which is weighted down by increasing weights, allowing testing under loads increasing from 576 to 1176 pounds and higher.

The test wheel is run for 60 minutes at each specified load and temperature readings are taken at 20-minute intervals. Except under the highest loads, the temperature in each run reaches a steady value ("steady-state temperature") by the end of the 60-minute experiment. Tire temperatures are measured at two probe holes molded into the tire for this purpose. A thermocouple probe connected to a digital read-out thermometer is used and measurements are averaged and adjusted to a standard 23° C. environmental temperature.

The procedure is followed in all its essentials to prepare and test wheels made from the macroglycols of Example 1a, b, and c. The following data are obtained:

|  |  | Steady State Temperature, °C. | | |
| --- | --- | --- | --- | --- |
| Load (lbs) | Ex. 3 | Ex. 3a | Ex. 3b | Ex. 3c |
| 576 | 70 | 78 | 73 | 74 |
| 776 | 84 | 96 | 98 | 88 |
| 976 | 100 | 117 | 123 | 126 |
| 1076 | 110 | 150 | 158 | 150 |
| 1176 | 124 | (—)* | (—) | (—) |

*indicates blow out

The data illustrate that the wheel made from the extracted macroglycol of example 1, prepared from thiodiethanol and 1,4-butanediol, achieved a lower steady-state temperature at a higher load than wheels prepared from similarly made macroglycols, using (a) ethylene glycol, (b) diethylene glycol, or (c) 1,6-hexanediol instead of 1,4-butanediol, all of which attained a higher steady-state temperature at a lower load and which "blew out" at the highest load.

EXAMPLE 4

The procedure of Example 1 is repeated except that the extraction step is omitted. The macroglycol is converted into a prepolymer using the procedure of Example 2 and into a wheel using the procedure of Example 3. The wheel is tested, as described in Example 3, and compared with the wheel made from the extracted macroglycol of Example 1. Dynamic mechanical properties are given below.

|  | Steady-State Temperature, °C. | |
| --- | --- | --- |
| Load (lbs) | Extracted (Ex. 3) | Non-Extracted (Ex. 4) |
| 980 | 96 | 109 |
| 1180 | 125 | 139 |
| 1380 | 165 | (—)* |

*indicates blow out

The data show the significant improvement in dynamic mechanical properties of wheels made from the extracted macroglycol of the invention as opposed to the same macroglycol without the extraction step.

We claim:

1. A polyurethane prepolymer comprising the reaction product of (A) a polyether-thioether copolymer glycol, represented by the formula:

H{OC$_2$H$_4$SC$_2$H$_4$}$_x${OC$_4$H$_8$}$_y$OH wherein the mole ratio of x/y ranges from about 45:55 to about 60:40 respectively, prepared by a process which comprises: (a) condensing, at a temperature of about 160°–205° C., in the presence of an acidic condensation catalyst, 1,4-butanediol with sufficient thiodiethanol to produce a trimer, represented by the formula:

HO—C$_4$H$_8$—O—C$_2$H$_4$SC$_2$H$_4$—O—C$_4$H$_8$—OH (b) completing the condensation, under the same conditions, by the incremental addition to said trimer, of the remaining thiodiethanol at a rate corresponding essentially to the rate of removal of water of reaction therefrom, such that no significant excess of thiodiethanol is present in the reaction mixture at any given time; (c) extracting the product of (b) with water, at a ratio of polymeric diol to water between about 2/1 and 1/3; and (d) recovering the extracted copolymer glycol, with B) a diisocyanate at a mole ratio of about 1/1.5 to 1/2.5.

2. A prepolymer according to claim 1 wherein the mole ratio of x/y is about 50:50, respectively.

3. A prepolymer according to claim 1 wherein said diisocyanate is toluenediisocyanate.

4. A prepolymer according to claim 1 wherein said catalyst is phosphorous acid.

5. A prepolymer according to claim 1 wherein said (d) comprises the steps of stripping the resultant extracted product with steam and drying the stripped product under vacuum.

6. A solid polyurethane tire prepared by reacting the prepolymer of claim 1 with from 90 to 110% of the stoichiometrically required amount of diamine and curing the resultant mixture in a mold.

7. A tire according to claim 6 wherein said diamine is selected from methylenebis (o-chloroaniline) and bis(2-aminophenylthio)ethane.

8. A tire according to claim 6 wherein the mole ratio of x/y is about 50:50, respectively.

* * * * *